United States Patent [19]

Tsushima et al.

[11] Patent Number: 5,142,402
[45] Date of Patent: Aug. 25, 1992

[54] POLARIZATION DIVERSITY OPTICAL RECEIVING APPARATUS AND METHOD

[75] Inventors: Hideaki Tsushima, Hachioji; Shinya Sasaki, Kodaira; Ryoji Takeyari, Kokubunji, all of Japan

[73] Assignee: Hitachi, Ltd., Tokyo, Japan

[21] Appl. No.: 450,697

[22] Filed: Dec. 14, 1989

[30] Foreign Application Priority Data

Dec. 16, 1988 [JP] Japan .................. 63-316356

[51] Int. Cl.$^5$ ............................ H04B 10/06
[52] U.S. Cl. ........................ 359/192; 359/156
[58] Field of Search ............ 455/616, 619, 617; 370/2; 359/156, 189, 191, 192, 193

[56] References Cited

U.S. PATENT DOCUMENTS

| | | | |
|---|---|---|---|
| 3,435,229 | 3/1969 | Buhrer | 455/606 |
| 4,506,388 | 3/1985 | Monerie et al. | 455/616 |
| 4,718,120 | 1/1988 | Tzeng | 455/616 |
| 4,723,316 | 2/1988 | Glance | 455/619 |
| 4,831,663 | 5/1989 | Smith | 455/616 |
| 4,887,314 | 12/1989 | Carroll et al. | 455/619 |
| 4,888,817 | 12/1989 | Ryu et al. | 455/619 |

FOREIGN PATENT DOCUMENTS

| | | | |
|---|---|---|---|
| 0342694 | 11/1989 | European Pat. Off. | 455/616 |
| 3431896 | 3/1986 | Fed. Rep. of Germany | 455/619 |
| 0013434 | 1/1984 | Japan | 370/2 |
| 0122140 | 7/1984 | Japan | 370/2 |

OTHER PUBLICATIONS

Journal of Light Wave Technology, vol. 6, No. 9, Sep. 1988, pp. 1386–1394.
Polarization-Diversity Receiver, IOOC, 1983, 30C3-2, pp. 386–387.

Primary Examiner—Edward L. Coles, Sr.
Assistant Examiner—Kinfe-Michael Negash
Attorney, Agent, or Firm—Pennie & Edmonds

[57] ABSTRACT

A polarization diversity optical receiving apparatus comprises at least one frequency converter for performing frequency conversion upon an IF signal, an adder for adding two IF signals together, and a demodulator for converting a signal outputted from the adder to a baseband signal.

19 Claims, 14 Drawing Sheets

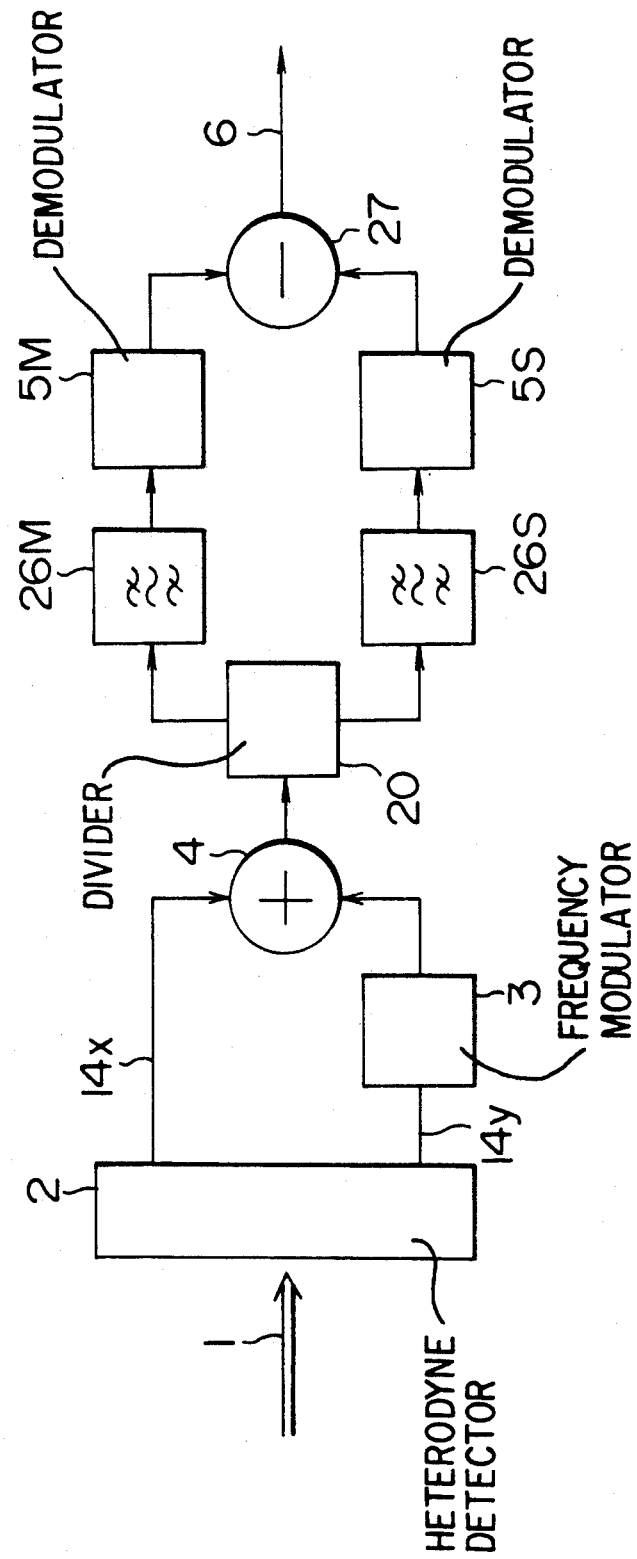

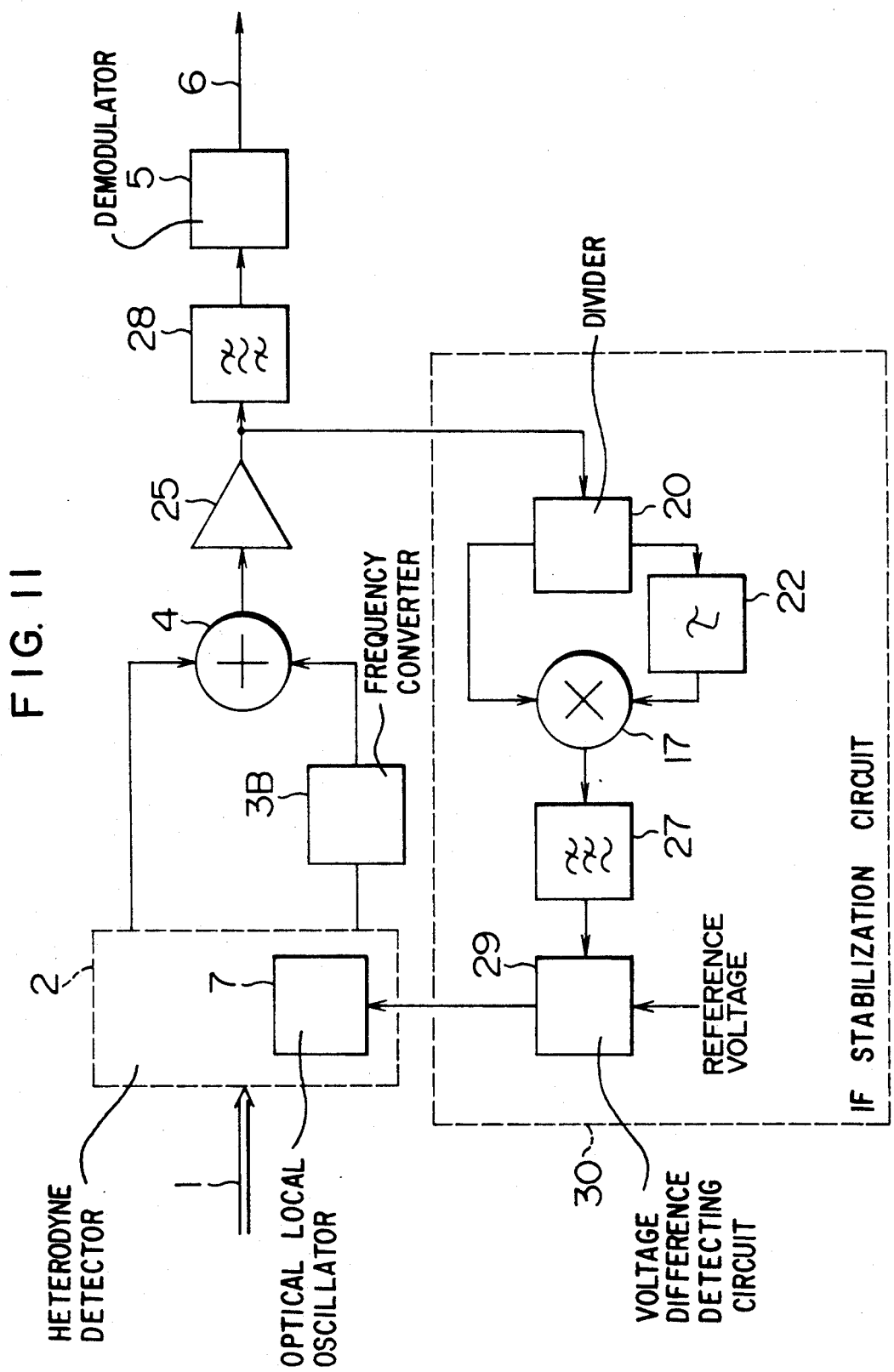

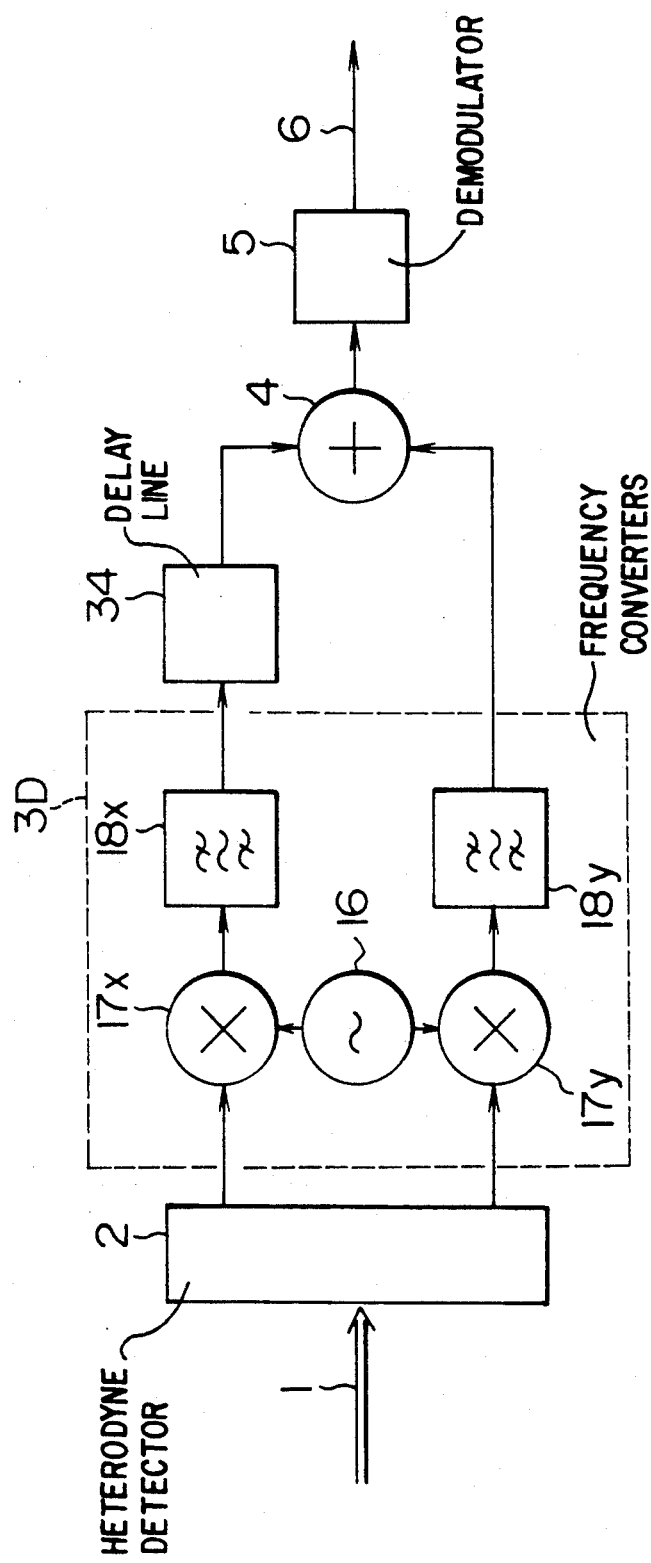

F I G. 15A
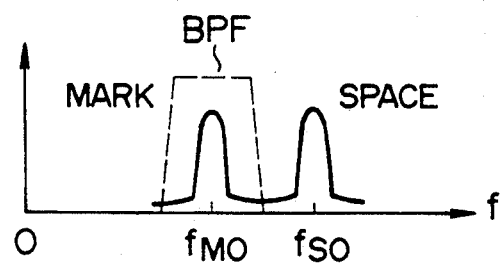
F I G. 15B
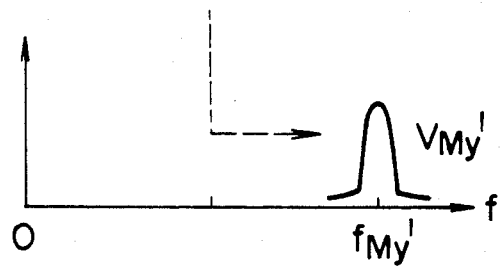
F I G. 15C
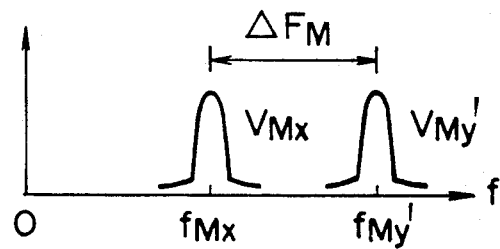

POLARIZATION DIVERSITY OPTICAL RECEIVING APPARATUS AND METHOD

BACKGROUND OF THE INVENTION

The present invention relates to a polarization diversity optical receiving method, its apparatus, an optical transmission apparatus, and an intermediate-frequency stabilization method which are simpler in configuration as compared with the prior art and which are suitable for cost reduction.

From the view-point of combining method of two branches outputs, polarization diversity optical receiving methods and their apparatuses used for coherent optical transmission are broadly classified into intermediate-frequency combining type and baseband combining type. Conventional polarization diversity optical receiving methods and their apparatuses of intermediate-frequency combining type are discussed in IOOC '83, 30C3-2, pp. 386 to 387, 1983, for example. Further, conventional polarization diversity optical receiving methods and apparatuses of baseband combining type are discussed in Meeting of Technical Group on Optical and Quantum Electronics, The Institute of Electronics, Information and Communication Engineers, OQE 88-70, 1988, for example.

Conventional intermediate-frequency stabilization methods are discussed in Meeting of Technical Group on Optical and Quantum Electronics, The Institute of Electronics, Information and Communication Engineers, OQE 88-85, 1988, for example.

In the above described conventional techniques of baseband combining type, two demodulators with the same characteristics are indispensable in order to convert two intermediate-frequency (hereafter referred to as IF) signals to baseband signals, respectively. An infinite quantity (dB) of dynamic range is required for each demodulator. ("Dynamic range" refers to a range of input signal power over which demodulators normally operate. The dynamic range is usually represented by the ratio of the maximum value of power to its minimum value.) This is because the proportion of the power of the optical signal inputted to one branch varies from 0% to 100% because of polarization fluctuations of the optical signal. On the other hand, in case of IF combining type, one modulator is needed, and the power variation of the inputted signal is as small as 3 dB. The IF combining type is thus free from problems a companed by the baseband type. However, an automatic phase controller needed to add two IF signals under the state that phases nearly agree with each other becomes very complicated in configuration because the phases of semiconductor lasers used as an optical transmittor and an optical local oscillator are very unstable. (In typical semiconductor laser, phase noises referred to as spectrum line width range from several MHz to several tens MHz.) This results in problems that the polarization diversity optical receiving apparatus becomes large in size, complicated in configuration and high in cost.

In the above described prior art of the IF stabilization method, an oscillator and a modulator are needed, and an apparatus for implementing stabilization thus becomes high in cost, resulting in a problem.

SUMMARY OF THE INVENTION

An object of the present invention is to realize a polarization diversity optical receiving method of IF combining type and its apparatus having features of a smaller size, a simpler configuration and a lower cost as compared with the prior art.

Another object of the present invention is to realize an IF stabilization method which can be implemented by using a low-cost apparatus.

The above described object is attained by applying frequency conversion to at least one of two IF signals obtained as a result of heterodyne detection, then adding the two IF signals, and inputting the resultant sum signal to a demodulator. This is because the frequency converter can be easily implemented by using simple configuration.

The above described object is attained by inputting the above described sum signal to a frequency discrimination detector and adjusting at least one of the frequency of the optical local signal and the conversion frequency of frequency converter so that the detector may produce a nearly constant output.

From the viewpoint of signal spectra, the process of frequency conversion and addition will now be described. FIG. 2 shows power density spectra of IF signals obtained at various locations of a polarization diversity optical receiving apparatus. The abscissa represents the frequency and the ordinate represents the power density. The signal modulation method may be any one of ASK (amplitude shift keying), narrow-band FSK (frequency shift keying) and DPSK (differential synchronous phase shift keying). Further, in case of wideband FSK, it may be considered that FIG. 2 represents either one of the mark signal component and the space signal component extracted by bandpass filters on respective branches. Two branches possessed by a polarization diversity optical receiving apparatus are referred to as "x" and "y", respectively. FIG. 2A and 2B show spectra of IF signals of x and y, respectively. Character $f_{IF}$ denotes an intermediate frequency. A signal bandwidth W depends upon the modulation method, the bit rate, the modulation condition and so on. Although the spectrum shape of FIG. 2A is nearly similar to that of FIG. 2B, power of each of FIG. 2A and 2B varies depending upon the polarization state of the optical signal. It is known that the power ratio between FIGS. 2A and 2B becomes equivalent to $\cos^2\theta$ : $\sin^2\theta$ when the power of the optical signal and the optical local signal is constant, (where $\theta$ is a variable representing the polarization state of the optical signal, and 0 degree $\leq \theta \leq$ 90 degrees). Independent of the polarization state of the optical signal, therefore, the sum of power of FIG. 2A and power of FIG. 2B becomes constant (and becomes independent of $\theta$). FIG. 2C shows the spectrum of the IF signal obtained by applying frequency conversion with a frequency $f_c$ to the spectrum shown in FIG. 2B. The IF has been shifted from $f_{IF}$ to $f_{IF}+f_c$. Further, the amplitude has been multiplied by a conversion factor k. Although FIG. 2C shows an example of up conversion, down conversion may also be used. FIG. 2D shows spectra obtained by adding the spectrum of FIG. 2A to that of FIG. 2C. If $f_c$ is equal to or larger than W ($f_c \geq W$), there is little interference between two IF signals and the two IF signals become nearly independent of each other. Therefore, the power of the spectrum shown in FIG. 2D is equal to the sum of power of FIG. 2A and power of FIG. 2C and is in proportion to $\cos^2\theta + k^2 \cdot \sin^2\theta$. Since $\theta$ varies in a range from 0 degree to 90 degrees, the ratio of the maximum value of power to the minimum value of power becomes $|20 \log k|$ dB. In case the conversion factor $k=0.5$, for example, the ratio becomes approximately 6 dB. Further, in case $k=1$, the ratio becomes unity and the power becomes constant independent of polarization fluctuations of the optical signal. Therefore, the dynamic range required for the demodulator whereto the spectra shown in FIG. 2D are inputted is represented as $|20 \log k|$ dB, and its minimum value is obtained when $k=0$ and becomes 0 dB.

The demodulation method for the spectra shown in FIG. 2D varies according to the modulation method. If ASK or wideband FSK is used as the modulation method, envelope detection or square detection can be used as the demodulation method. Assuming now that amplitudes of two IF signals contained in the spectra shown in FIG. 2D are $\cos\theta$ and $k\sin\theta$, respectively, the output of the envelope detector with respect to the input shown in FIG. 2D is a baseband signal, and its amplitude is proportionate to $\cos\theta + k\sin\theta$. If the envelope detector has amplitude squaring property (i.e., property that the amplitude of the output signal is nearly proportionate to the square of the amplitude of the input signal), the amplitude of the baseband signal is proportionate to $\cos^2\theta + k^2\sin^2\theta$. If the relation $k=1$ is nearly satisfied, therefore, the amplitude and power of the baseband signal also become nearly constant independent of polarization fluctuations of the optical signal.

In case the narrow-band FSK is used as the modulation method, frequency discrimination detection of delay demodulation type can be used. FIG. 3B shows input-output characteristics of the frequency discriminator. FIG. 3A is equivalent to FIG. 2D. By making intermediate frequencies $f_{IF}$ and $f_{IF} + f_c$ of two IF signals nearly agree with zero cross frequencies of FIG. 3B as shown in FIG. 3, for example, a baseband signal having an amplitude nearly proportionate to $\cos^2\theta + k\sin^2\theta$ can be obtained. The property of power of the baseband signal is the same as that of envelope detection.

If DPSK is used as the modulation method, differentially coherent detection can be used as the demodulation method. By making $f_{IF}$ and $f_{IF} + f_c$ equivalent to integer times as large as $1/T$ (where T denotes time of one bit), the same result as that of narrow-band FSK can be obtained.

As heretofore described, the present invention makes it possible to realize a polarization diversity optical receiving method of IF combining type and its apparatus by using a frequency converter having simple configuration without using an automatic phase controller. This results in an effect that the apparatus can be made small in size, simple in configuration and low in cost.

Independent of polarization fluctuations of the optical signal, the power variation of the sum signal shown in FIG. 2D is within $|20 \log k|$ dB. Therefore, the intermediate frequency can be stabilized by dividing a part of the sum signal, inputting the resultant signal to a frequency discriminator having a dynamic range more than $|20 \log k|$ dB, and adjusting at least one of the frequency of an optical local oscillator and the conversion frequency of frequency converters of both branches so that the output of the discriminator may become nearly constant. Since it is only necessary to input the sum signal directly to the frequency discriminator, frequency stabilization can be realized at a lower cost as compared with the prior art, resulting in an effect.

BRIEF DESCRIPTION OF THE DRAWINGS

FIGS. 8, 9, 13 and 14 are configuration diagrams of fourth, fifth, sixth and seventh embodiments, respectively;

FIGS. 11 and 17 are diagrams for illustrating first and second embodiments of an intermediate frequency stabilization method.

DESCRIPTION OF THE PREFERRED EMBODIMENTS

Figure 1:
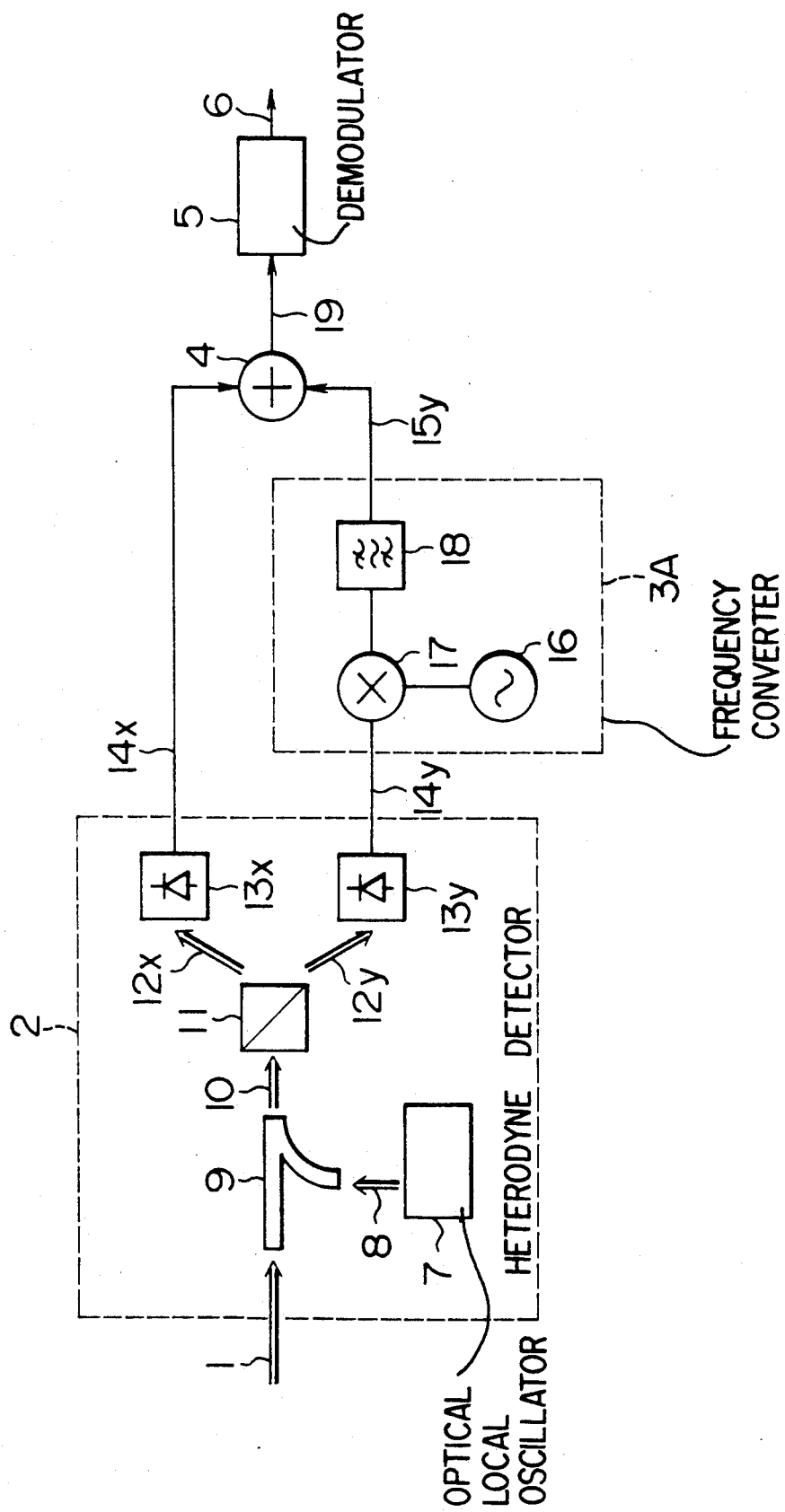
FIG. 1 is a configuration diagram of a first embodiment of the present invention.
Figure 2A:
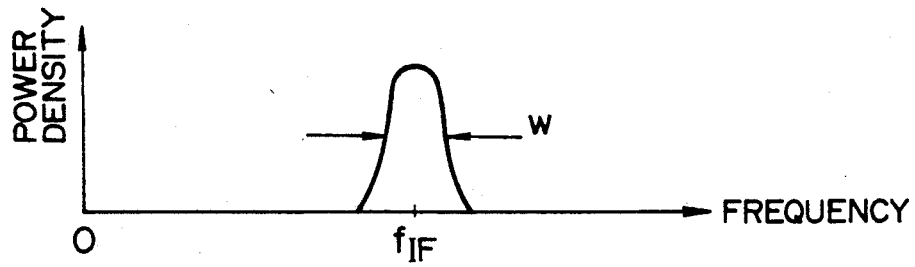
FIGS. 2A, B, C, D show spectra of signals appearing at various locations of FIG. 1.
Figure 2B:
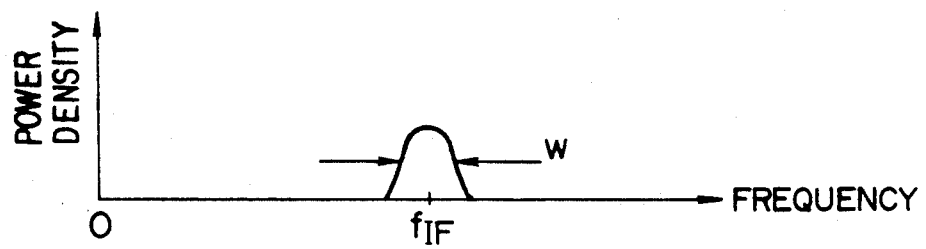
Figure 2C:
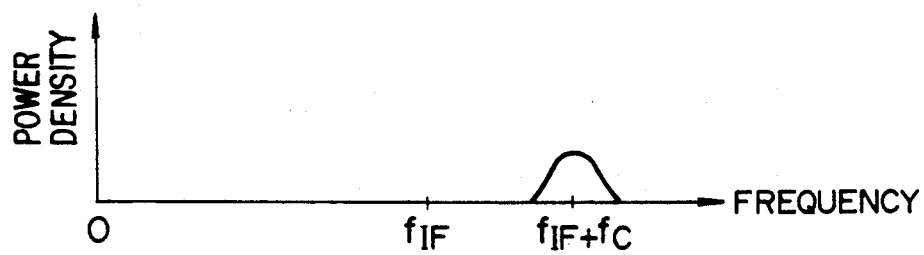
Figure 2D:
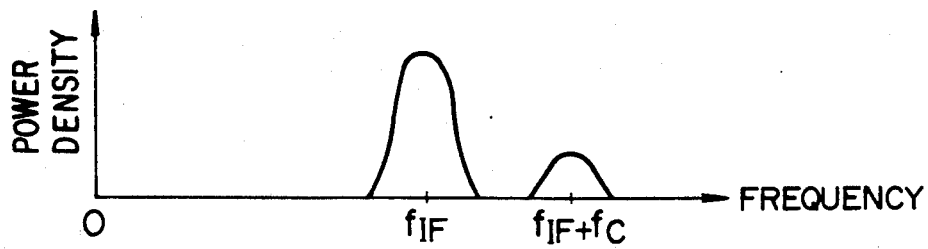

A first embodiment of a polarization diversity optical receiving apparatus according to the present invention will now be described by referring to FIG. 1. An optical signal 1 is inputted to a heterodyne detector 2. In the heterodyne detector 2, an optical local signal 8 outputted from an optical local oscillator 7 such as a semiconductor laser is combined with the optical signal 1 by an optical coupler 9, the resultant combined optical signal 10 being thus outputted. By a polarization beam splitter 11, the combined optical signal is split into two polarization components 12x and 12y which are perpendicular to each other. The components 12x and 12y are inputted to optical detectors 13x and 13y comprising photodiodes and outputted as IF signals 14x and 14y. At this time, the optical local signal is divided nearly equally into 14x and 14y. Examples of spectra of 14x and 14y are shown in FIG. 2A and 2B. The IF signal 14y is inputted to a frequency converter 3A and outputted as an IF signal 15y shifted in intermediate frequency by $f_c$. In the frequency converter 3A, the IF signal 14y and a sine wave signal having a frequency $f_c$ outputted from an oscillator 16 are inputted to a frequency mixer 17. As a result, an IF signal obtained by up-converting the IF signal 14y by the frequency $f_c$ and another IF signal obtained by down-converting the IF signal 14y by the frequency $f_c$ are obtained as the output of the frequency mixer 17. A bandpass filter 18 extracts only either one of two IF signals outputted from the frequency mixer 17. If the down-converted signal is extracted by the bandpass filter, 3A acts as a frequency converter of down conversion. If the up-converted signal is extracted by the bandpass filter, 3A acts as a frequency converter of up conversion. If the frequency mixer is one of image rejection type, the filter 18 may be omitted in some cases. An example of the spectrum of the IF signal 15y outputted from the frequency converter is shown in FIG. 2C. The IF signals 14x and 15y are added together in an adder 4, a sum signal 19 being outputted. An example of spectra of the sum signal 19 is shown in FIG. 2D. Numeral 5 denotes a demodulator, which produces a baseband signal 6 on the basis of the sum signal 19. As described before, the variation range of power of the sum signal 19 becomes $|20 \log k|$ dB, where k is the ratio (conversion factor) of the input signal amplitude of the frequency converter 3 to the output signal amplitude thereof.

Figure 3A:
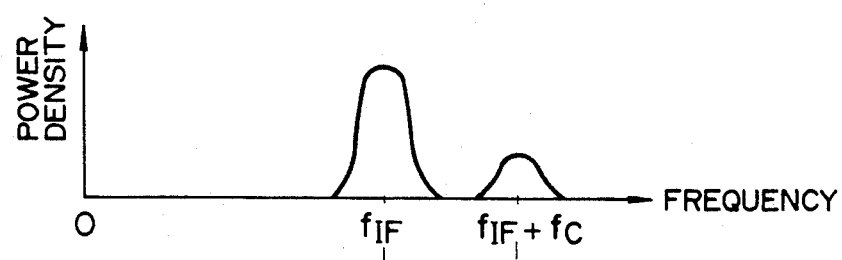
FIGS. 3A, B show frequency relations between the spectra and frequency discrimination characteristics of a demodulator.
Figure 3B:
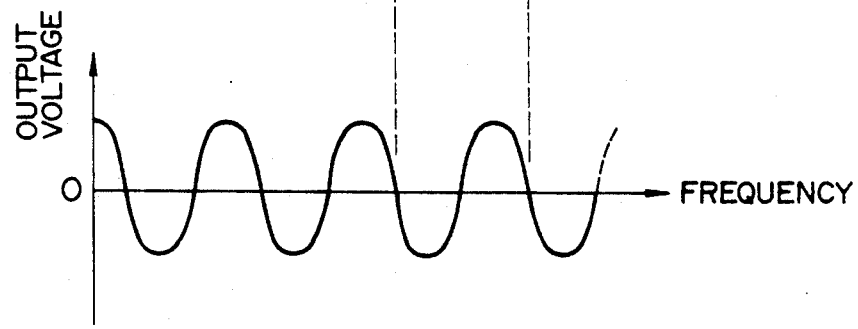
Figure 4A:
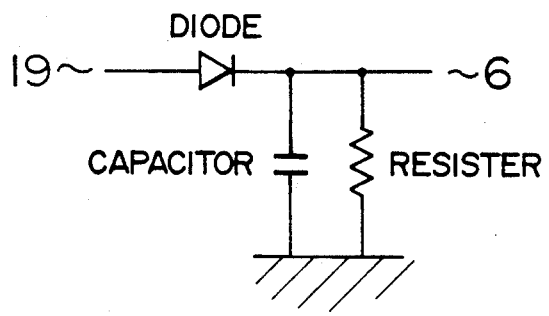
FIGS. 4A, B, C show an example of configuration of the demodulator.
Figure 4B:
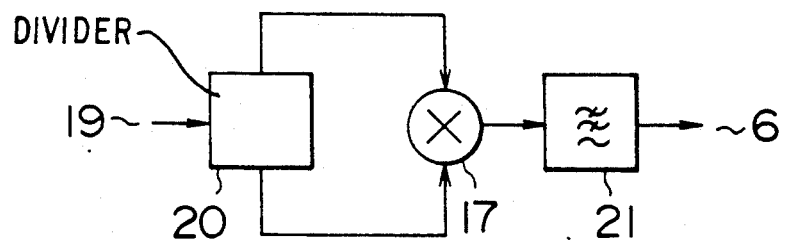
Figure 4C:
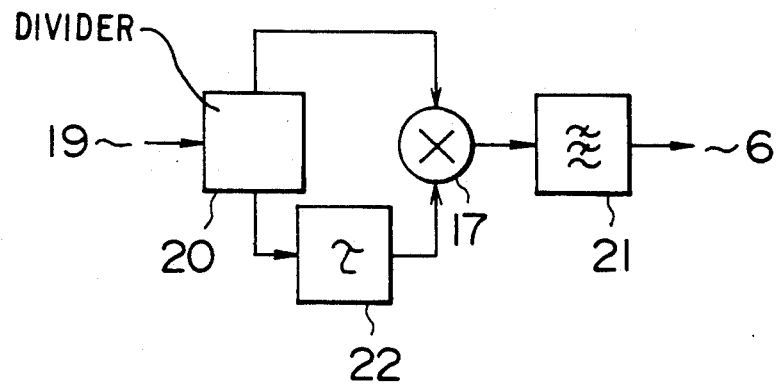

In case ASK is used as the signal modulation method, or in case either one of the mark signal component and the space signal component extracted by bandpass filters on respective branches in wideband FSK is to be demodulated, an envelope detector or a square detector can be used as the demodulator 5. The envelope detector can be implemented by using configuration shown in FIG. 4A, for example. The square detector can be implemented by using configuration shown in FIG. 4B. FIG. 4A shows an example in which a diode, a capacitor and a resistor are used. In FIG. 4B, the square detector is implemented by dividing the sum signal 19 in a divider 20, providing two signals resulting from the division with nearly equal delay times, inputting the two signals thus provided with delays to a frequency mixer 17, and extracting a baseband signal alone out of the output of 17 in a lowpass filter 21. In case of wideband FSK, a bandpass filter for extracting only either the mark signal component or the space signal component may be added to the stage preceding the diode shown in FIG. 4A and the stage preceding the divider 20 shown in FIG. 4B, for example. In case narrow-band FSK is used as the signal modulation scheme, a frequency discriminator of delay demodulation type can be used as the demodulator 5. This discriminator can be implemented by using configuration shown in FIG. 4C, for example. The configuration of FIG. 4C is obtained by adding a delay line 22 to the configuration of FIG. 4B. In the configuration of FIG. 4C, zero cross frequencies of the output voltage can be made to agree with $f_{IF}$ and $f_{IF}+f_c$ as shown in FIG. 3 by adjusting a delay time $\tau$. In case DPSK is used as the signal modulation scheme, a differential coherent detector can be used as the demodulator. Configuration of this detector is the same as that of FIG. 4C. However, $\tau$ must be nearly equal to time T of one bit period of the signal.

The present embodiment makes it possible to realize a polarization diversity optical receiving method of IF combining type and its apparatus by using a frequency converter having simple configuration without using an automatic phase controller. This results in an effect that the apparatus can be made small in size, simple in configuration and low in cost.

Even in case a balanced receiver is used in the heterodyne detector, the above described effect is obtained in the same way. Further, even in case frequency converters are disposed respectively on both branches, a similar effect is obtained. At this time, it is possible that the two frequency converters may use a single oscillator in common.

Figure 5:
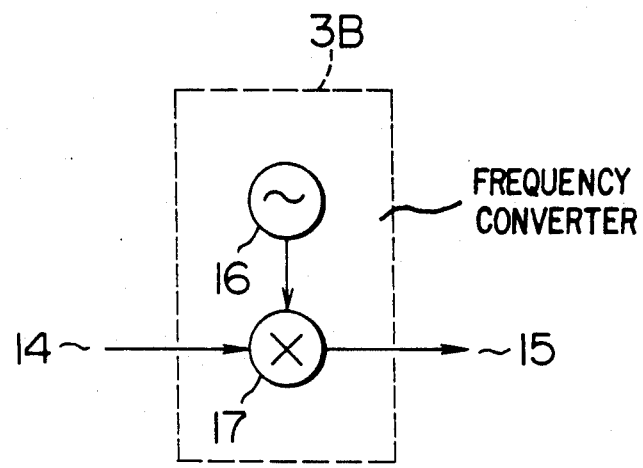
FIGS. 5 and 7 show configurations of frequency converters used in second and third embodiments, respectively.
Figure 6A:
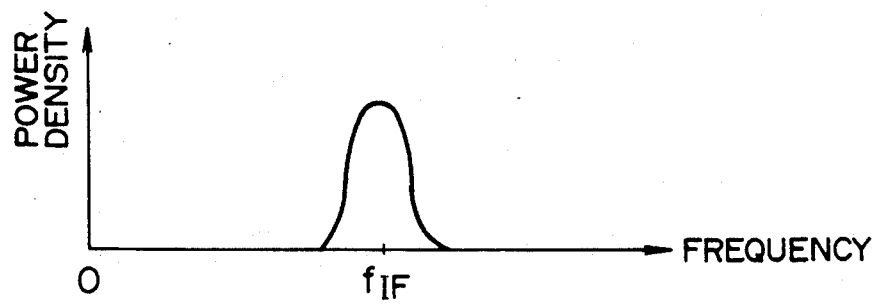
FIGS. 6A, B, C, D show spectra of signals appearing at various locations of the second embodiment.
Figure 6B:
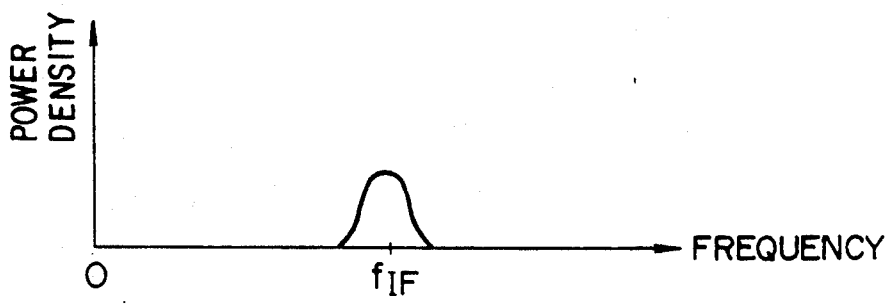
Figure 6C:
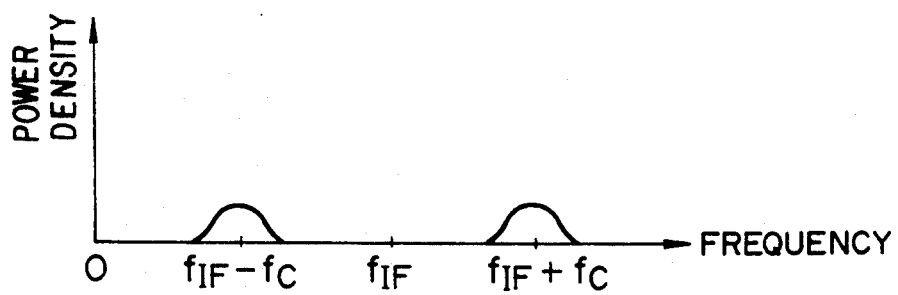
Figure 6D:
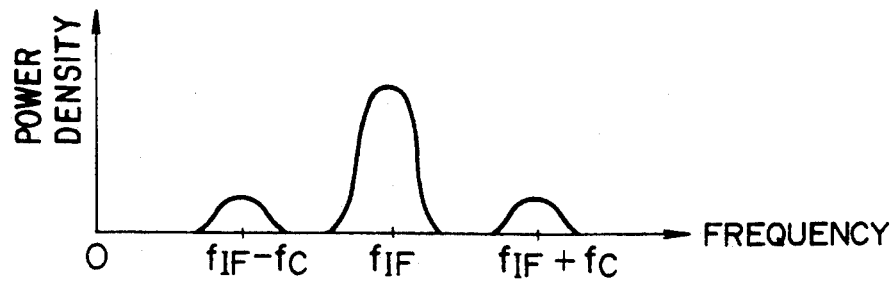

In a second embodiment of the polarization diversity optical receiving method and its apparatus according to the present invention, the frequency converter has configuration shown in FIG. 5. In the present embodiment, two IF signals up-converted and down-converted are contained in the signal 15 outputted from the frequency converter 3B. Signals appearing at various locations in the present embodiment are shown in FIG. 6. FIG. 6A and 6B show spectra of the IF signals 14x and 14y, respectively. FIG. 6C shows spectra of a signal obtained by inputting the signal of FIG. 6B to 3B. The spectra of FIG. 6C comprises the spectrum of an IF signal obtained by down-converting the signal of FIG. 6B by the frequency $f_c$ and the spectrum of another IF signal obtained by up-converting the signal of FIG. 6B by the frequency $f_c$. FIG. 6D shows spectra of the sum signal 19, which are equivalent to the sum of spectra of FIG. 6A and 6C. The signal of FIG. 6D can be converted to a baseband signal by using the same demodulator as that of the first embodiment.

In the present embodiment, an effect similar to that of the first embodiment is obtained and at the same time the bandbass filter of the frequency converter can be omitted. This results in an effect that the apparatus can be made further simple in configuration, small in size, and low in cost.

Figure 7:
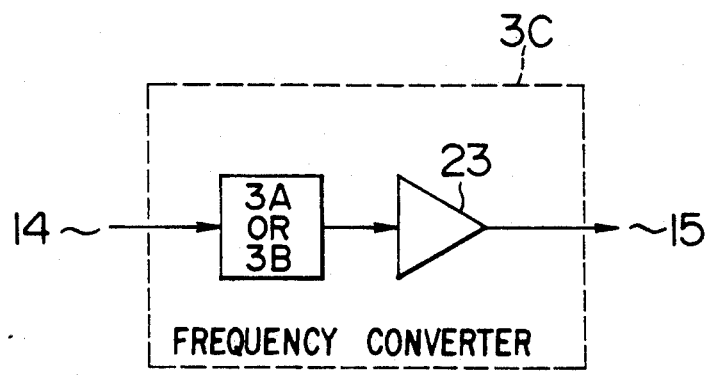

Configuration of a frequency converter used in a third embodiment of the polarization diversity optical receiving method and its apparatus is shown in FIG. 7. The frequency converter of FIG. 7 is obtained by adding an amplifier 23 to the frequency converter of the first and second embodiments so as to be located in a stage preceding or succeeding the frequency converter. Although the variation range of power of the signal 19 is given by $|20 \log k|$ dB, the value of k can be controlled by the gain of the amplifier 23. By adjusting the gain of the amplifier 23 so that k may become approximately unity, the variation width of power of the signal 19 can be made approximately 0 dB independent of the polarization state of the optical signal. That is to say, power of the signal inputted to the demodulator always becomes constant, and the dynamic range required for the demodulator is also narrowed to approximately 0 dB.

In the present embodiment, an effect similar to that of the first and second embodiments is obtained, and at the same time an effect that the dynamic range required for the demodulator is narrowed to approximately 0 dB is also obtained.

Figure 8:
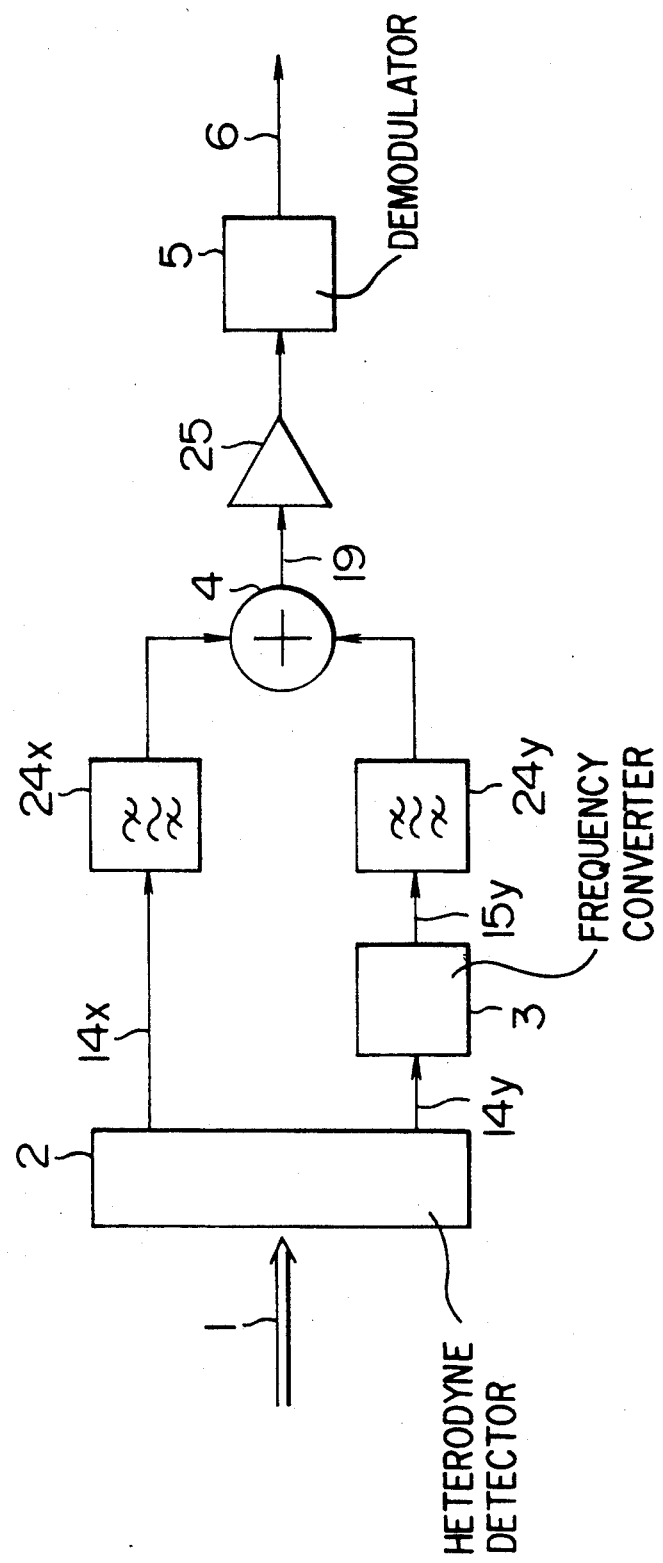

FIG. 8 shows a fourth embodiment of the polarization diversity optical receiving method and its apparatus. In the present embodiment, the IF signals 14x and 15y are respectively passed through bandpass filters 24x and 24y and then added together in order to suppress interference between the IF signals 14x and 15y for reducing deterioration in transmission characteristics caused by the interference. So long as interference can be suppressed, 24x and 24y may also be highpass filters or lowpass filters. Further, in the present embodiment, the gain of an automatic gain control amplifier 25 is so controlled that power of a signal inputted to the demodulator may become nearly constant even in case power of the signal 19 varies. Even if k=1, power of the signal 19 varies as a result of fluctuation in power of the optical signal and the optical local signal. By adding the amplifier 25, therefore, power of the input signal to the demodulator 5 can be made nearly constant even if the power of the optical signal and the optical local signal varies. A frequency converter 3 of FIG. 8 may be any one of 3A, 3B and 3C.

In the present embodiment, effects similar to those of the first to third embodiments are obtained. At the same time, it becomes possible to suppress interference between two IF signals, and to suppress deterioration in transmission characteristics caused by variation in power of the sum signal, which is caused by variation in power of the optical signal and the optical local signal, resulting in another effect. Even if only either one of 24 and 25 is used, the effect caused by one used is obtained.

Figures 10A, 10B, 10C:
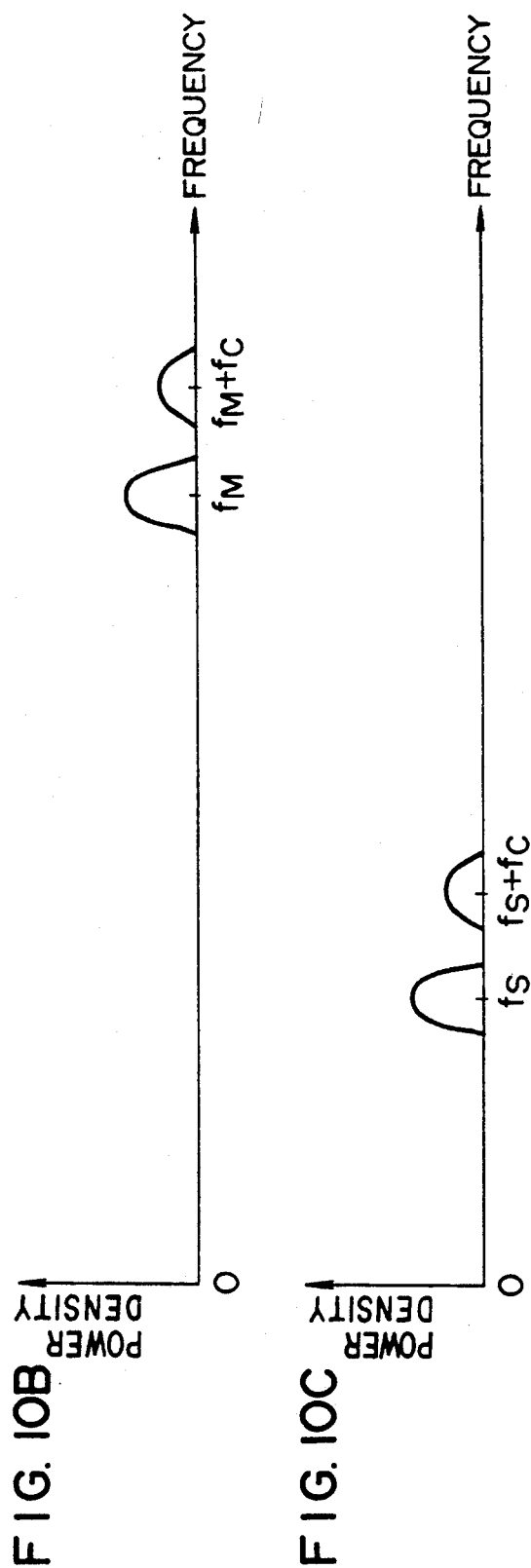
FIGS. 10A, B, C and 15A, B, C show spectra of signals appearing at various locations in the fifth and seventh embodiments, respectively.

FIG. 9 shows a fifth embodiment. The present embodiment aims at improving the signal-to-noise ratio (i.e., SNR) of the demodulated signal 6 by receiving a wideband FSK optical signal and demodulating both the mark signal component and the space signal component. The signal outputted from the adder 4 is divided into two signals by the divider 20. A bandpass filter 26M extracts only the mark signal components from one of the divided signals. A bandpass filter 26S extracts only the space signal components from the other of the divided signals. Examples of spectra of signals outputted from the adder 4 and the bandpass filters 26M and 26S are shown in FIG. 10. FIG. 10A shows the output signal of the adder 4. In this example, 3B is used as the frequency converter. Characters $f_M$ and $f_S$ represent center frequencies of the mark and space signal components before frequency conversion. Further, broken lines represent examples of passband. However, the passband of the filter may include the down-converted IF signal. FIG. 10B shows the output of the bandpass filter 26M, in which only the mark signal components have been extracted. Further, FIG. 10C shows the output of the bandpass filter 26S, in which only the space signal components have been extracted.

Demodulation methods of FIG. 10B and 10C are the same as those of the first to fourth embodiments. Demodulators 5M and 5S are envelope detectors or square detectors. Baseband signals outputted from the demodulators 5M and 5S undergo subtraction in a subtracter 27 to produce one baseband signal 6. The SNR of the baseband signal 6 is higher than the SNR of each of output signals from the demodulators 5M and 5S by approximately 3 dB. Therefore, the bit error rate characteristics and receiving sensitivity are improved.

In the present embodiment, effects similar to those of the first to third embodiments are obtained. At the same time, the bit error rate characteristics and the receiving sensitivity for wideband FSK signals can be improved, resulting in an effect.

FIG. 11 shows a first embodiment of the IF stabilization method. In FIG. 11, 3B of FIG. 5 is used as the frequency converter. Spectra of the signal outputted from the AGC amplifier 25 are symmetrical around $f_{IF}$ as shown in FIG. 6D. This symmetry is maintained independent of the polarization state of the optical signal. Numeral 28 denotes a filter for removing one of the down-converted IF signal and the up-converted IF signal contained in the output of the AGC amplifier 25. Numeral 30 denotes an IF stabilization circuit for implementing the above described stabilization. The output of the AGC amplifier is divided, and one of the divided outputs is inputted to the IF stabilization circuit to undergo frequency discrimination. A frequency discriminator can be implemented by using the configuration as shown in FIG. 4C, for example. If the intermediate frequency varies, output voltage of the frequency discriminator varies. Numeral 29 denotes a circuit for detecting difference voltage between the output voltage of the frequency discriminator and reference voltage and for controlling the optical frequency of the optical local oscillator 7 so as to make the above described difference voltage approach zero. It is known that the circuit 29 can be implemented by using a circuit comprising an operational amplifier, for example. By setting the zero cross frequency of the frequency discriminator at $f_{IF}$ and setting the reference voltage of the circuit 29 at zero volt, for example, the intermediate frequency is stabilized to $f_{IF}$.

The present embodiment brings about an effect that IF stabilization can be realized by using a simpler configuration than that of the prior art.

The above described effect can be obtained even in the absence of the AGC amplifier and the filter 28. Further, a similar effect is obtained even if the frequency converter 3A or 3C is used instead of 3B. Further, a similar effect is obtained even when frequency converters are disposed on both of two branches x and y and oscillators respectively incorporated in those frequency converters are controlled by the output of the circuit 29.

Figure 17:
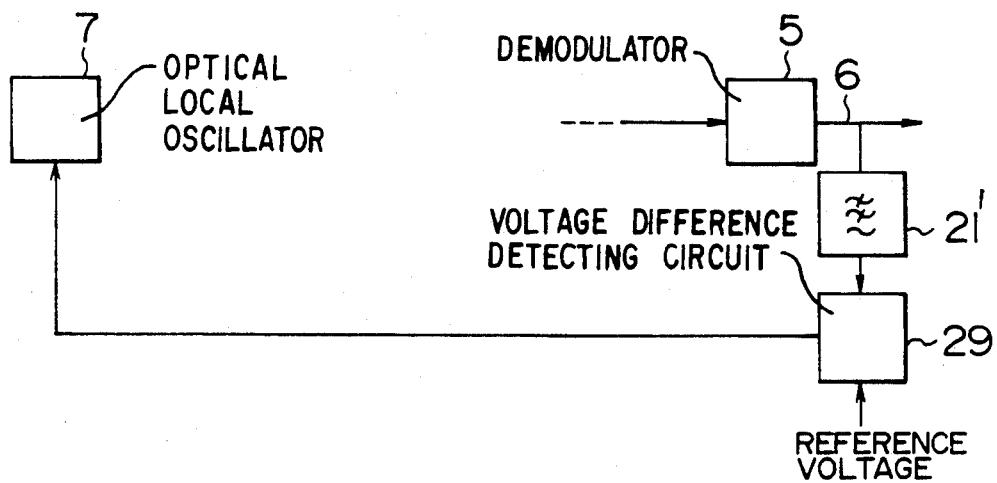

In case the delay demodulator as shown in FIG. 4C is used as the demodulator 5, the intermediate frequency can be stabilized in the same way even if a part of the baseband signal 6 is divided and its low-frequency component is extracted and inputted to the circuit 29. This is because the delay demodulator acts as a frequency discriminator as well. An example of configuration of the system in that case is shown in FIG. 17 as a second embodiment. A part of the output signal 6 of the demodulator 5 functioning as a delay demodulator is passed through a lowpass filter 21' and then inputted to the circuit 29. The output of the circuit 29 controls the optical local oscillator 7.

In the present embodiment, an effect similar to that of the first embodiment of IF stabilization is obtained. At the same time, the present embodiment brings about another effect that the circuit can be made simpler as compared with the first embodiment.

Figure 12:
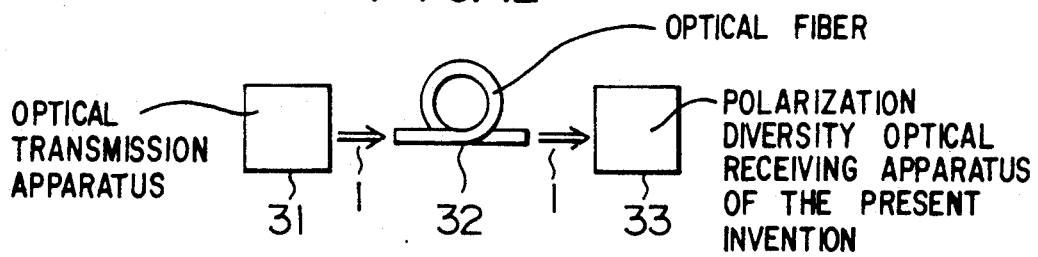
FIG. 12 is a configuration diagram of an optical transmission apparatus.

FIG. 12 shows an embodiment of an optical transmission apparatus. Numeral 31 denotes a conventional optical transmission apparatus, which outputs an ASK, FSK or DPSK optical signal. Numeral 32 denotes an optical fiber for guiding an optical signal 1. Numeral 33 denotes a polarization diversity optical receiving apparatus according to the present invention. The present embodiment brings about an effect that an optical transmission apparatus having less deterioration in transmission characteristics caused by polarization fluctuations in the optical signal can be implemented at a low cost.

The above described effect can be obtained in the same way even when the optical signal propagates through air instead of the optical fiber and even in application to ratio transmission.

FIG. 13 shows a sixth embodiment of the polarization diversity optical receiving apparatus. In the present embodiment, frequency converters are disposed on both of two branches x and y, and the two frequency converters use the oscillator 16 in common. Characters 17x and 17y denote frequency mixers. Character 18x denotes a bandpass filter for extracting the up-converted IF signal, for example. On the other hand, 18y denotes a filter for, on the contrary, extracting the down-converted signal. Further, numeral 34 denotes a delay line for making electrical lengths of the two branches x and y agree with each other. The length of the delay line 34 may be fixed after it has been set at an optimum value.

In the present embodiment, effects similar to those of the first embodiment are obtained. At the same time, the present embodiment brings about another effect that power of the signal outputted from the adder 4 can be made nearly constant because two IF signals are multiplied by nearly identical conversion coefficients.

Figure 14:
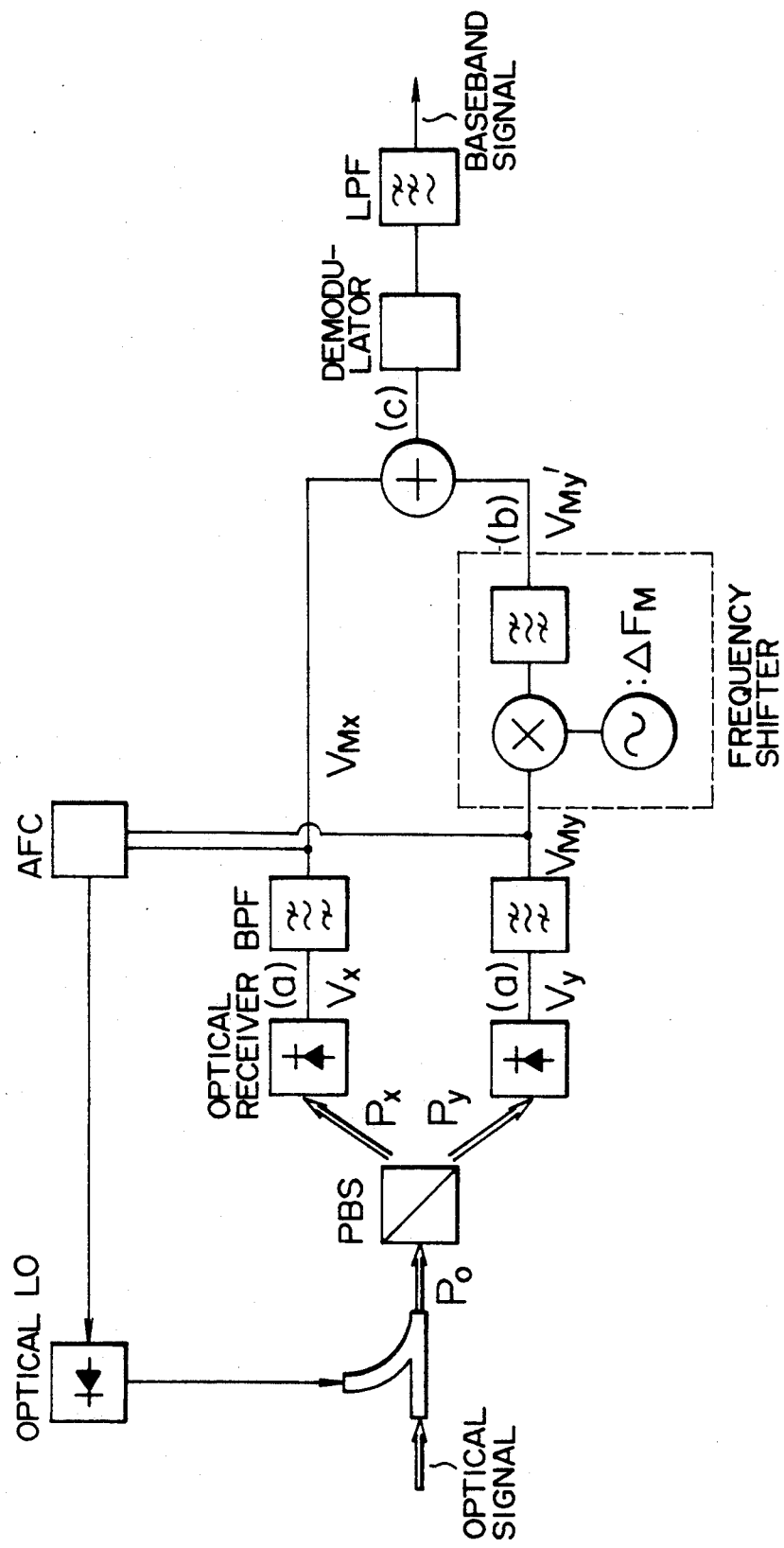

FIG. 14 shows a seventh embodiment of the polarization diversity optical receiving method and its apparatus.

The configuration of the proposed polarization diversity receiver is shown in FIG. 14. Optical signal $P_0$ combined with optical local power is split into x and y polarization components, $P_x$ and $P_y$, respectively, by polarization beam splitter (PBS). Two IF signals with the same carrier frequency, $v_x$ and $v_y$, are obtained as outputs from respective optical receivers. As shown in FIG. 15A, only the mark components (at frequency $f_{MO}$) are filtered by the bandpass filters (BPFs). Next, the mark component from the y-branch $v_{My}$ is frequency shifted to be centered at $f_{My}'$, as shown in FIG. 15B. Frequency shifted mark component $v_{My}'$ is added to mark component from the x-branch $v_{Mx}$ to obtain a composite signal as shown in FIG. 15C. Envelope detection can be applied to this composite IF signal to obtain polarization independent baseband signal. It is important to choose frequency interval $\Delta F_M$ sufficiently large to demodulate the signal without the use of APC. Otherwise interference between the two mark components can significantly degrade bit error rate as will be shown later.

FSK signal with a $z^7-1$ pseudorandom pattern of 250 Mb/s was used in the experiment. Frequency deviation was chosen to be 800 MHz. A PBS has an insertion loss of 5.5 dB and an extinction ratio of more than 30 dB. Local power input to each optical receiver is $-12.2$ dBm. The IF linewidth without modulation is 30 MHz. The frequency of the mark component before frequency shift is 1440 MHz. The conversion loss of the frequency mixer is 6 dB.

Figure 16:
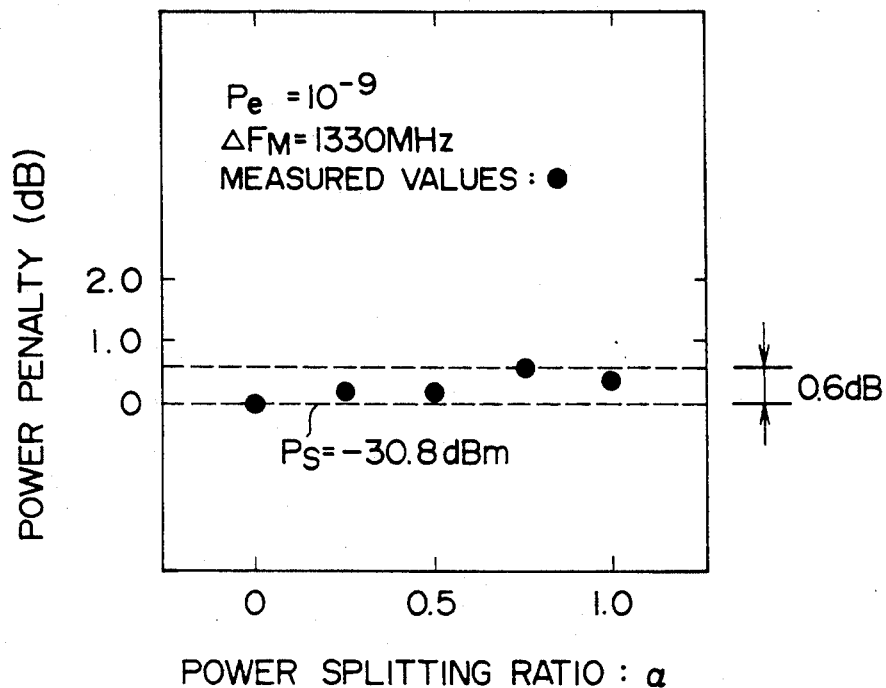
FIG. 16 shows results of experiment obtained by the apparatus shown in FIG. 14 and indicates that the receiving sensitivity scarcely depends upon polarization.

FIG. 16 shows dependence of the power penalty on the SOPs of the signals at a bit error rate of $10^{-9}$. The vertical axis shows penalties for $P_3 = -30.8$ dBm. A variation in power penalties of less than 0.6 dB was obtained. These results show that polarization-insensitive receiver can be realized through the use of the proposed method.

As the demodulator, the square detector as shown in FIG. 4B or a delay demodulator as shown in FIG. 4C can also be used instead of the envelope detector as shown in FIG. 4D.

A diversity receiving method using the frequency conversion method or demodulation method indicated in any embodiment of the present invention can be used in application other than optical transmission such as radio transmission. In the same way, the IF stabilization method indicated in any embodiment of the present invention can be used in application other than optical transmission such as radio transmission.

The present invention makes it possible to realize a polarization diversity optical receiving method of IF combining type and its apparatus by using a frequency converter having a simple configuration without using an automatic phase controller. The present invention thus brings about an effect that the apparatus can be made small in size, simple in configuration and low in cost.

Further, the present invention brings about another effect that IF stabilization can be realized by using simpler configuration than that of the prior art.

What is claimed is:

1. A polarization diversity optical receiving method including a heterodyne detector having an optical local oscillator, comprising the steps of:
    inputting an optical signal to said heterodyne detector;
    outputting an optical local signal from said optical local oscillator;
    combining said optical signal with said optical local signal;
    splitting the combined optical signal into two polarization components which ar perpendicular to each other;
    detecting two IF signals from said two polarization components by optical detectors;
    applying frequency conversion to at least one of said two IF signals; and
    thereafter adding said two IF signals together to perform demodulation.

2. A polarization diversity optical receiving method according to claim 1, further comprising a step of converting a signal obtained through the adding step to a baseband signal and wherein the step of outputting an optical local signal further comprises the steps of:
    detecting the difference in voltage between a voltage of the baseband signal and a reference voltage; and
    controlling a frequency of said optical local oscillator so as to make the difference in voltage approach zero.

3. A polarization diversity optical receiving method according to claim 1, wherein the step of outputting an optical local signal further comprises the steps of:
    dividing a part of the two IF signals which has been added;
    inputting the part thus divided to a frequency discriminator;
    detecting the difference in voltage between an output voltage of said frequency discrimination and a reference voltage; and
    controlling a frequency of said optical local oscillator so as to make the difference in voltage approach zero.

4. A polarization diversity optical receiving apparatus comprising:
    a heterodyne detector having an optical local oscillator for outputting an optical local signal, an optical coupler for combining said optical local signal with an optical input signal, a polarization beam splitter for splitting the combined optical signal into two polarization components which are perpendicular to each other, and first and second optical detectors for detecting first and second IF signals from said two polarization components;
    a frequency converter connected to said first optical detector for performing frequency conversion on said first IF signal;
    an adder connected to said frequency converter and said second optical detector for adding said first and second IF signals together; and
    a demodulator connected to said adder for converting a signal outputted from said adder to a baseband signal.

5. A polarization diversity optical receiving apparatus according to claim 4, further comprising:
    a first filter inserted between said first optical detector and said adder; and
    a second filter inserted between said second optical detector and said adder.

6. A polarization diversity optical receiving apparatus according to claim 4, wherein said frequency converter comprises:
   an oscillator; and
   a frequency mixer supplied with an output of said oscillator and an IF signal.

7. A polarization diversity optical receiving apparatus according to claim 4, wherein said frequency converter comprises:
   an oscillator;
   a frequency mixer supplied with an output of said oscillator and an IF signal; and
   a bandpass filter for extracting one of up-converted and down-converted IF signals included in a signal outputted from said frequency mixer.

8. A polarization diversity optical receiving apparatus according to claim 6, wherein said frequency converter further comprises an amplifier connected to said frequency mixer.

9. A polarization diversity optical receiving apparatus according to claim 6, wherein the amount of frequency conversion of said IF signal by said frequency converter is not less than the bandwidth of said IF signal.

10. A polarization diversity optical receiving apparatus according to claim 4, wherein said demodulator comprises an envelope detector.

11. A polarization diversity optical receiving apparatus according to claim 4, wherein said demodulator comprises:
    a bandpass filter for extracting one of a mark signal component and a space signal component included in the IF signal outputted from said adder; and
    an envelope detector supplied with a signal outputted from said bandpass filter.

12. A polarization diversity optical receiving apparatus according to claim 4, wherein said demodulator comprises:
    a divider for dividing said IF signal outputted from said adder into two IF signals;
    a first bandpass filter for extracting a mark signal component from one of said two IF signals outputted from said divider;
    a first envelope detector supplied with an output of said first bandpass filter;
    a second bandpass filter for extracting a space signal component from the other of the two IF signals outputted from said divider;
    a second envelope detector supplied with an output of said bandpass filter; and
    a subtracter for subtracting an output of said second envelope detector from an output of said first envelope detector.

13. A polarization diversity optical receiving apparatus according to claim 4, wherein said demodulator comprises a divider for dividing the signal outputted from said adder into two signals;
    a delay line for delaying one of said two signals; and
    a frequency mixer for mixing the delayed signal and the other of said two signals.

14. A polarization diversity optical receiving apparatus according to claim 4, wherein said demodulator comprises a differential coherent detector.

15. A polarization diversity optical receiving apparatus according to claim 4, wherein said demodulator has a property in which the amplitude of the output signal becomes nearly equal to the square of the amplitude of the input signal.

16. A polarization diversity optical receiving apparatus according to claim 4, further comprising an automatic gain control amplifier so disposed in a stage preceding the demodulator as to make the power of a signal inputted to said demodulator nearly constant.

17. A polarization diversity optical receiving apparatus according to claim 4, further comprising a frequency converter inserted between the second optical detector and said adder for performing frequency conversion upon the second IF signal.

18. A polarization diversity optical receiving apparatus according to claim 4, further comprising a delay line disposed on at least one of two branches made between said optical detectors and said adder so that electrical lengths of the two branches may become nearly equivalent.

19. A polarization diversity optical receiving apparatus comprising:
    a heterodyne detector having an optical local oscillator for outputting an optical local signal, an optical coupler for combining said optical local signal with an optical input signal, a polarization beam splitter for splitting the combined optical signal into two polarization components which are perpendicular to each other, and first and second optical detectors for detecting first and second IF signals from said two polarization components;
    a frequency converter connected to one of said first and second optical detectors for performing frequency conversion on one of said first and second IF signals;
    an adder connected to said frequency converter and the other of said first and second optical detectors for adding the converted IF signal to the other of said first and second IF signals; and
    a demodulator connected to said adder for converting the added signal to a baseband signal.

* * * * *